United States Patent
Comet

(10) Patent No.: US 10,844,922 B2
(45) Date of Patent: Nov. 24, 2020

(54) MULTI-CLOSURE ENERGY DISSIPATING TOUCH FASTENER LINKS

(71) Applicant: Velcro BVBA, Deinze (BE)

(72) Inventor: Carlos Sáez Comet, Barcelona (ES)

(73) Assignee: Velcro BVBA, Deinze (BE)

( * ) Notice: Subject to any disclaimer, the term of this patent is extended or adjusted under 35 U.S.C. 154(b) by 113 days.

(21) Appl. No.: 15/840,205

(22) Filed: Dec. 13, 2017

(65) Prior Publication Data

US 2018/0180130 A1 Jun. 28, 2018

Related U.S. Application Data

(60) Provisional application No. 62/437,780, filed on Dec. 22, 2016.

(51) Int. Cl.
*F16F 7/08* (2006.01)
*F16F 7/00* (2006.01)
(Continued)

(52) U.S. Cl.
CPC ............ *F16F 7/08* (2013.01); *A44B 18/0015* (2013.01); *A44B 18/0084* (2013.01);
(Continued)

(58) Field of Classification Search
CPC .... F16F 7/08; A44B 18/0015; A44B 18/0084; A62B 35/04
See application file for complete search history.

(56) References Cited

U.S. PATENT DOCUMENTS

| 1,935,339 | A | * | 11/1933 | Tricau | B64D 17/36 |
| | | | | | 244/151 R |
| 3,444,957 | A | * | 5/1969 | Gilpin, Jr. | F16F 7/00 |
| | | | | | 182/3 |

(Continued)

FOREIGN PATENT DOCUMENTS

| CN | 102575478 | 7/2012 |
| CN | 104394941 | 3/2015 |

(Continued)

OTHER PUBLICATIONS http://translationportal.epo.org/emtp/translate/?ACTION=description-retrieval&COUNTRY=DE&ENGINE=google&FORMAT=docdb&KIND=A1&LOCALE=en_EP&NUMBER=4005563&OPS=ops.epo.org/3.2&SRCLANG=de&TRGLANG=en (Year: 2019).*

(Continued)

*Primary Examiner* — Katherine W Mitchell
*Assistant Examiner* — Candace L Bradford
(74) *Attorney, Agent, or Firm* — Fish & Richardson P.C.

(57) ABSTRACT

An energy dissipating link includes: an elongated base having opposite, first and second end portions; and a plurality of touch fasteners permanently coupled to the base, each of the plurality of touch fasteners releasably engageable with at least one other of the touch fasteners. The plurality of touch fasteners is arranged on the base to form first and second closures, each including engagements between respective fastening elements of two or more of the plurality of touch fasteners. The plurality of touch fasteners is configured such that: in response to a tensile load applied to the end portions of the base, the engaged touch fasteners of the first closure are loaded in shear along a shear plane; and in response to a tensile overload condition causing shear displacement of the touch fasteners of the first closure, the (Continued)

engaged touch fasteners of the second closure are subjected to a peel load.

17 Claims, 7 Drawing Sheets

(51) Int. Cl.
*A44B 18/00* (2006.01)
*A62B 35/04* (2006.01)
*A62B 35/00* (2006.01)

(52) U.S. Cl.
CPC .............. *A62B 35/04* (2013.01); *F16F 7/006* (2013.01); *A62B 35/0012* (2013.01); *A62B 35/0075* (2013.01)

(56) References Cited

U.S. PATENT DOCUMENTS

| | | | |
|---|---|---|---|
| 3,778,870 A * | 12/1973 | Bennett | A44B 18/0015 24/449 |
| 3,804,698 A * | 4/1974 | Kinloch | F16F 7/12 428/176 |
| 3,937,407 A | 2/1976 | Matsuo | |
| 4,100,996 A | 7/1978 | Sharp | |
| 4,271,566 A | 6/1981 | Perina | |
| 4,446,944 A | 5/1984 | Forrest | |
| 4,538,702 A | 9/1985 | Wolner | |
| 4,794,028 A | 12/1988 | Fischer | |
| 5,090,503 A | 2/1992 | Bell | |
| 5,113,981 A | 5/1992 | Lantz | |
| 5,174,410 A | 12/1992 | Casebolt | |
| 5,238,279 A | 8/1993 | Anteau | |
| 5,316,102 A | 5/1994 | Bell | |
| 5,529,343 A | 6/1996 | Klink | |
| 5,598,900 A | 2/1997 | O'Rourke | |
| 5,609,365 A | 3/1997 | Holka | |
| 5,658,012 A | 8/1997 | Villarreal | |
| 5,960,480 A | 10/1999 | Neustater | |
| 5,996,189 A | 12/1999 | Wang | |
| 5,997,981 A | 12/1999 | McCormack | |
| 6,299,040 B1 | 10/2001 | Matias | |
| 6,533,066 B1 | 3/2003 | O'Dell | |
| 6,589,638 B1 | 7/2003 | McCormack | |
| 6,648,101 B2 | 11/2003 | Kurtgis | |
| 6,698,544 B2 | 3/2004 | Kurtgis | |
| 6,883,640 B2 | 4/2005 | Kurtgis | |
| 6,960,314 B2 | 11/2005 | Lacey et al. | |
| 6,990,928 B2 | 1/2006 | Kurtgis | |
| 7,106,205 B2 | 9/2006 | Graef | |
| 7,146,690 B2 | 12/2006 | Stanford | |
| 7,237,650 B2 | 7/2007 | Casebolt | |
| 7,392,881 B1 | 7/2008 | Choate | |
| 7,650,717 B2 * | 1/2010 | Drayer | A01G 17/10 47/32.5 |
| 7,726,350 B2 * | 6/2010 | Jennings | A62B 35/04 139/383 B |
| 7,716,792 B2 | 8/2010 | Clarner | |
| 7,909,137 B2 | 3/2011 | Green | |
| 8,267,471 B2 | 9/2012 | Reel | |
| 8,375,529 B1 | 2/2013 | Duffy | |
| 8,584,799 B1 * | 11/2013 | Dennington | A62B 35/04 182/3 |
| 8,701,826 B2 | 4/2014 | Smith et al. | |
| 9,958,070 B2 | 5/2018 | Cornu | |
| 10,125,837 B1 | 11/2018 | Fegley | |
| 10,154,707 B2 | 12/2018 | Prest | |
| 2003/0150087 A1 * | 8/2003 | Dieterich | A44B 18/0084 24/306 |
| 2006/0216461 A1 | 9/2006 | Tachauer | |
| 2017/0368386 A1 * | 12/2017 | Wu | A62B 35/04 |
| 2018/0178047 A1 * | 6/2018 | Comet | F16F 7/08 |

FOREIGN PATENT DOCUMENTS

| | | |
|---|---|---|
| DE | 4005563 | 8/1991 |
| DE | 10 2013 017680 | 4/2015 |
| FR | 2596092 | 9/1987 |
| FR | 2870686 | 12/2005 |
| FR | 2952654 | 5/2011 |
| GB | 2136915 | 9/1984 |
| JP | S5576235 | 6/1980 |

OTHER PUBLICATIONS

PCT Written Opinion of the International Preliminary Examining Authority in International Application No. PCT/EP2017/0834, dated Dec. 10, 2018, 16 pages.

International Search Report and Written Opinion in International Application No. PCT/EP2017/083277, dated Apr. 20, 2018, 19 pages.

International Search Report and Written Opinion in International Application No. PCT/EP2017/083412, dated May 4, 2018, 18 pages.

* cited by examiner

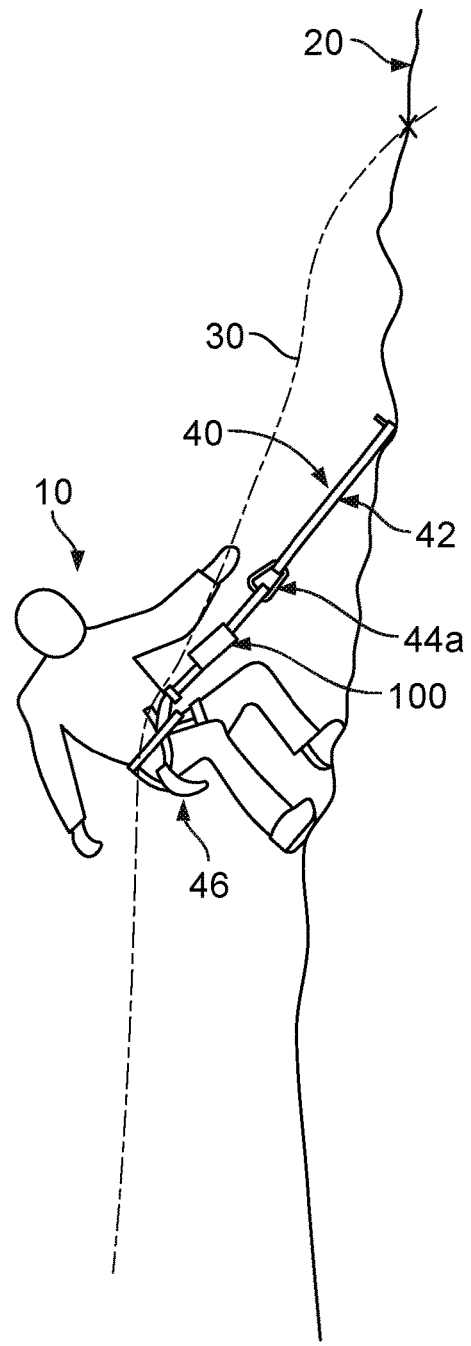
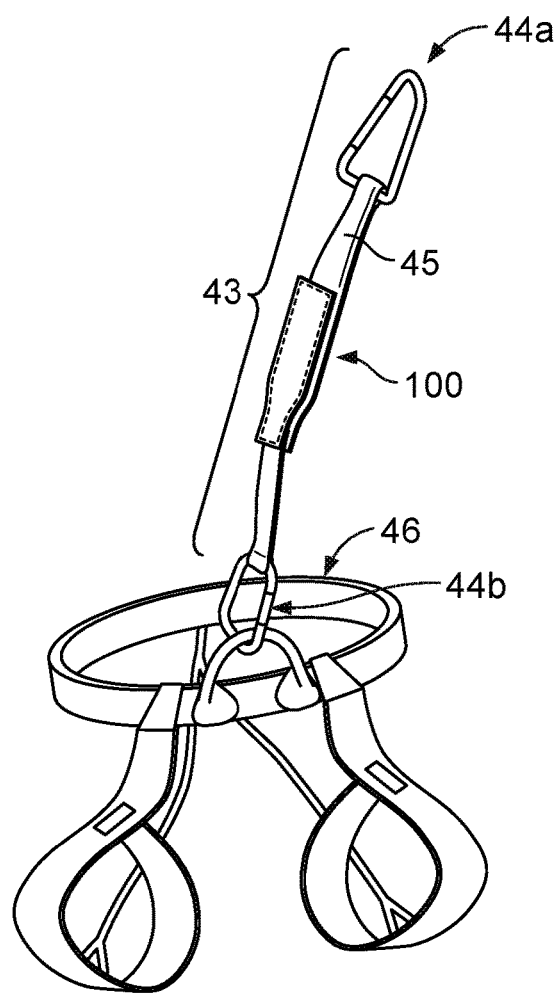
FIG. 1A
FIG. 1B

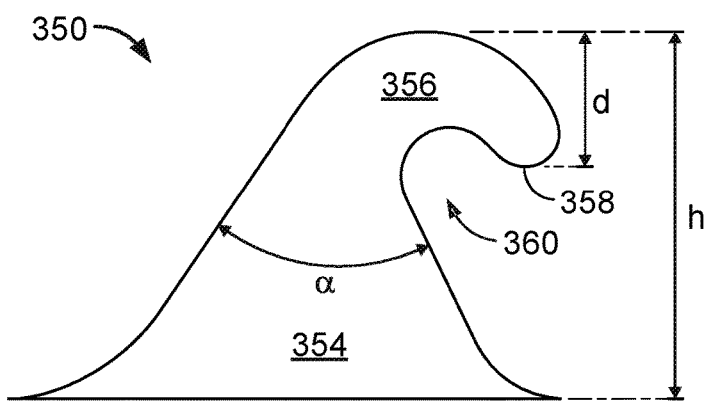
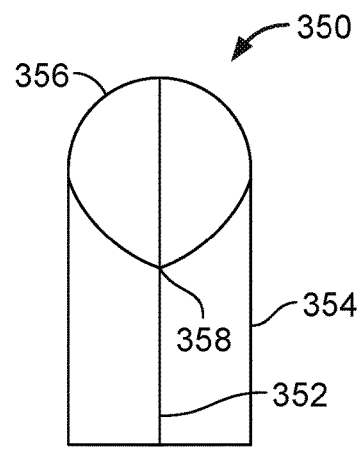
FIG. 3A             FIG. 3B
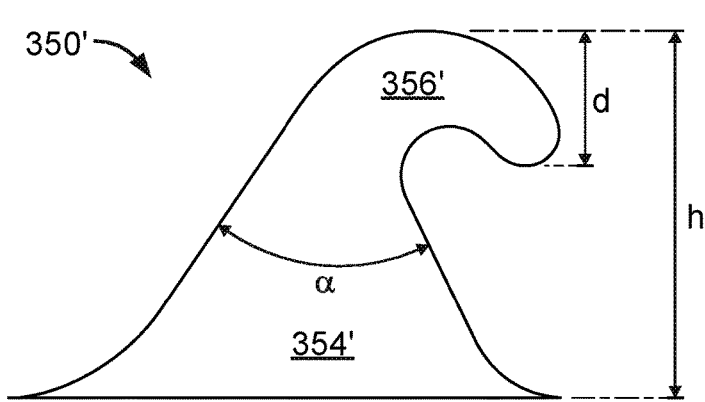
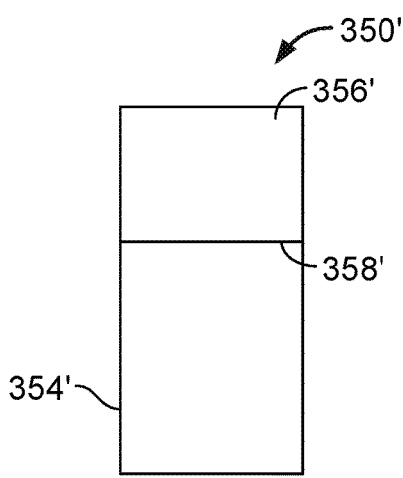
FIG. 3C             FIG. 3D

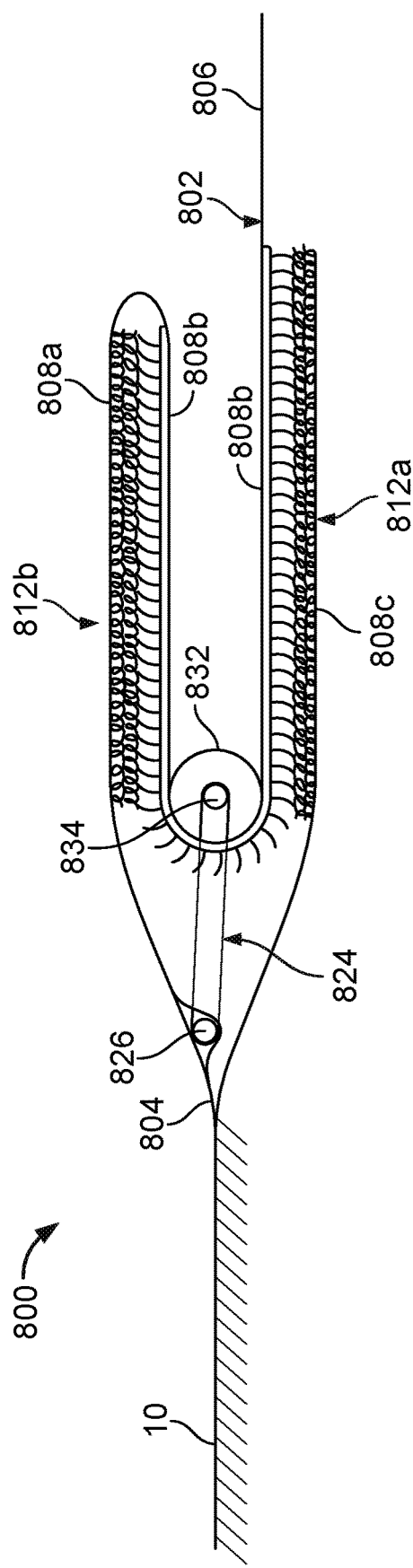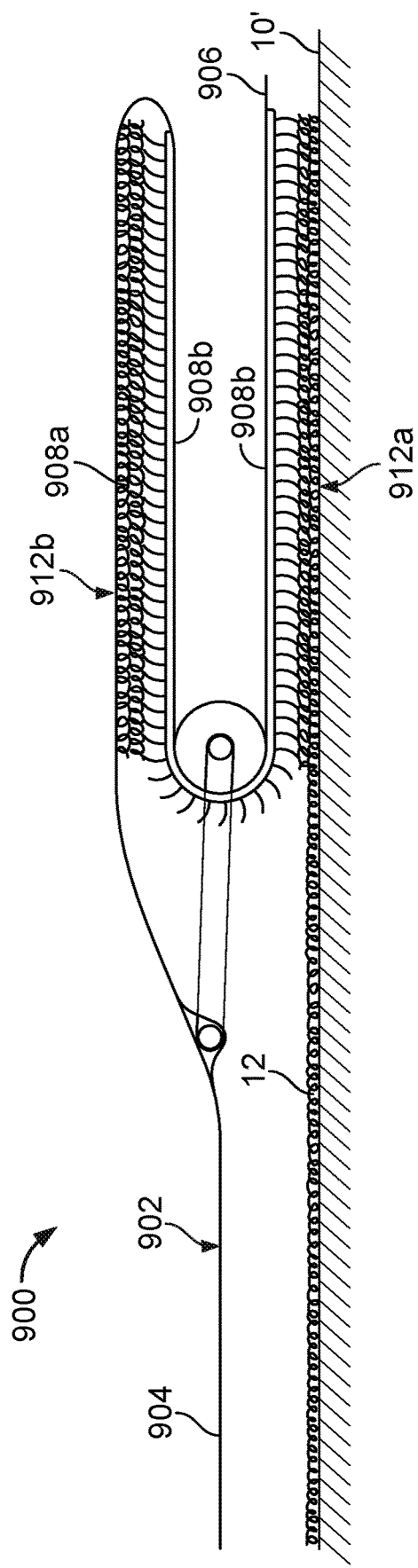

MULTI-CLOSURE ENERGY DISSIPATING TOUCH FASTENER LINKS

TECHNICAL FIELD

This specification generally relates to energy dissipating links formed by releasably engageable touch fasteners. In particular, the specification describes energy dissipating touch fastener links having multiple independent closures.

BACKGROUND

Mechanical devices for dissipating kinetic energy are used as shock absorbers and/or brakes in a wide variety of fields. One particular field where energy dissipating devices are employed is fall prevention. In fact, safety regulations in many jurisdictions require fall prevention systems to be employed for persons working in elevated environments. Fall prevention systems are also used by rock and wall climbing enthusiasts. Energy dissipators in the context of climbing activities are typically incorporated in safety lines that connect the climber to a stable structure. The safety line connection effectively protects the climber from a prolonged free fall and impact with the ground. Still, the effect of gravity on even a short free fall without impact may exert an injurious arresting force on the climber when the fall is abruptly halted by the safety line. Energy dissipators are specifically designed to mitigate this arresting force. The vast majority of energy dissipating devices currently in use involve one or more pieces of flexible textile material arranged in a folded, overlapping configuration and connected (e.g., stitched, woven, or loomed) together at certain discrete points. These devices dissipate kinetic energy in the safety line by using tensile force in the line to instigate the breaking/tearing of the discrete connection points.

SUMMARY

In one aspect, an energy dissipating link includes: an elongated base having opposite, first and second end portions; and a plurality of touch fasteners permanently coupled to the base, each of the plurality of touch fasteners releasably engageable with at least one other of the touch fasteners. The plurality of touch fasteners is arranged on the base to form separate and independent first and second closures, each of the first and second closures including engagements between respective fastening elements of two or more of the plurality of touch fasteners. The plurality of touch fasteners is configured such that: in response to a tensile load applied to the end portions of the base, the engaged touch fasteners of the first closure are loaded in shear along a shear plane; and in response to a tensile overload condition causing shear displacement of the touch fasteners the first closure, the engaged touch fasteners of the second closure are subjected to a peel load.

In some examples, the second closure is formed on a slack idler section of the base that at least partially overlaps the first closure.

In some examples, at least one of the plurality of touch fasteners is associated with both of the first and second closures.

In some examples, the link further includes a sleeve covering a portion of the base supporting the first and second closures, the sleeve inhibiting movement of the base and the engaged touch fasteners of the first and second closures in a direction perpendicular to the shear plane of the first closure.

In some examples, the link further includes a guide member configured to constrain movement of an intermediate portion of the base between the first and second end portions along a defined path as the first and second closures are disengaged in shear and peel, respectively. In some examples, the guide member includes a transverse base support secured to one of the end portions of the base and about which the intermediate portion of the base is trained. In some examples, the transverse base support includes an edge of an opening of a sleeve surrounding the first closure. In some examples, the transverse base support includes a roller rotatable about an axis defined by a roller support fixed to one of the end portions of the base. In some examples, the transverse base support includes: an attachment piece held fixed relative to one of the first or second end portions of the base; and a guide rod coupled to the attachment piece, with the intermediate portion of the base routed through an opening between the attachment piece and the guide rod. In some examples, the transverse base support is disposed adjacent a peel point of disengagement between the touch fasteners of the second closure. In some examples, the transverse base support is disposed adjacent a point of shear re-engagement between a touch fastener of the second closure and a touch fastener of the first closure.

In some examples, the shear plane extends parallel to the base within the first closure.

In some examples, at least one of the plurality of touch fasteners includes an array of discrete male fastening elements, each fastening element including an upstanding stem extending outwardly from the base and a head extending integrally from a distal end of the stem to a tip. In some examples, at least another of the plurality of touch fasteners includes a field of loops, and the heads of the male fastening elements include a lower surface forming a crook for retaining the loops. In some examples, a majority of the discrete fastening elements include one-way hooks, with the head of each fastening element of the majority extending forward from the stem in the same direction.

In some examples, a first touch fastener of the first closure is directly attached to the base and the remainder of the first touch fastener is free standing relative to the base, such that, upon tensile overload, an opposite free-standing end of the first touch fastener is displaced under shear load with respect to a second touch fastener of the first closure. In some examples, two longitudinal ends of the second touch fastener are both directly attached to the base.

In another aspect, an energy dissipating link includes: an elongated base having opposite, first and second end portions; and a plurality of touch fasteners permanently coupled to the base and releasably engageable with at least one other of touch fastener. When the link is in a primed state, the plurality of touch fasteners forms separate and independent first and second closures, each of the first and second closures including engagements between respective fastening elements of two or more touch fasteners. The plurality of touch fasteners is configured such that, in response to a tensile overload applied to the end portions of the base, the touch fasteners of the first and second closures engaged in the primed state of the link are progressively disengaged, with at least a portion of one touch fastener of the second closure re-engaging with at least a portion of one touch fastener of the first closure as the tensile overload is applied.

In some examples, the first closure is configured such that the tensile overload bears on the touch fasteners of the first closure in shear. In some examples, the second closure is configured such that the tensile overload bears on the touch fasteners of the second closure in peel. In some examples, the plurality of touch fasteners is configured such that the re-engaged portion of the touch fastener of the second closure is loaded in shear with the portion of the touch fastener of the first closure.

In some examples, the second closure is formed on a slack idler section of the base that at least partially overlaps the first closure.

In some examples, at least one of the plurality of touch fasteners is associated with both of the first and second closures.

In some examples, the link further includes a sleeve covering a portion of the base supporting the first and second closures, the sleeve inhibiting movement of the base and the engaged touch fasteners of the first and second closures in a direction perpendicular to a shear plane of the first closure.

In some examples, the link further includes a guide member configured to constrain movement of an intermediate portion of the base between the first and second end portions along a defined path as the first and second closures are disengaged and re-engaged in response to the tensile overload. In some examples, the guide member includes a transverse base support secured to one of the end portions of the base and about which the intermediate portion of the base is trained. In some examples, the transverse base support includes an edge of an opening of a sleeve surrounding the first closure. In some examples, the transverse base support includes a roller rotatable about an axis defined by a roller support fixed to one of the end portions of the base. In some examples, the transverse base support includes: an attachment piece held fixed relative to one of the first or second end portions of the base; and a guide rod coupled to the attachment piece, with the intermediate portion of the base routed through an opening between the attachment piece and the guide rod. In some examples, the transverse base support is disposed adjacent a peel point of disengagement between the touch fasteners of the second closure. In some examples, the transverse base support is disposed adjacent a point of shear re-engagement between a touch fastener of the second closure and a touch fastener of the first closure.

In some examples, at least one of the plurality of touch fasteners includes an array of discrete male fastening elements, each fastening element including an upstanding stem extending outwardly from the base and a head extending integrally from a distal end of the stem to a tip. In some examples, at least another of the plurality of touch fasteners includes a field of loops, and the heads of the male fastening elements include a lower surface forming a crook for retaining the loops. In some examples, a majority of the discrete fastening elements include one-way hooks, with the head of each fastening element of the majority extending forward from the stem in the same direction.

In some examples, a first touch fastener of the first closure is directly attached to the base and the remainder of the first touch fastener is free standing relative to the base. In some examples, two longitudinal ends of a second touch fastener of the first closure are both directly attached to the base.

In some examples, at least one of the first or second closures includes at least one touch fastener supported on an external structure independent of the elongated base.

Yet another aspect features a method of arranging an energy dissipating link for a tether in a primed state. The link includes an elongated base having opposite, first and second end portions; and a plurality of touch fasteners permanently coupled to the base, each of the plurality of touch fasteners being releasably engageable with at least one other of the touch fasteners. The method includes: drawing the first end portion of the base towards the second end portion; and then engaging two or more of the plurality of touch fasteners to form a first closure configured to transmit a tensile load between the first and second end portions of the base; forming a longitudinally slack idler section of the base between the two end portions; and then engaging two or more of the plurality of touch fasteners to form a second closure along the idler section, the second closure being separate and independent of the first closure.

In yet another aspect, a load-limited connection includes: a flexible substrate carrying one of two mating sections of a touch fastener along a first length of the substrate, and the other of the two mating sections of the touch fastener along a second length of the substrate and spaced from the first length such that, with the substrate folded at a first fold between the two lengths of the two mating sections of touch fastener overlap in an engaged state; and a supplemental mating section of touch fastener engaged with said one of two mating sections of touch fastener, with the substrate folded at a second fold within the first length, such that said one of two mating sections of touch fastener extends on both sides of the second fold, and such that a tensile load applied to an end of the substrate adjacent the second length and exceeding a tensile limit of the connection will progressively release the two mating sections of touch fastener in a peel mode, will load the supplemental mating section of touch fastener in a shear mode, and will roll said one of the two mating sections through the second fold, moving touch fasteners unloaded in peel into shear load.

In some examples, the load-limited connection further includes a fold support secured to the substrate at a support mount disposed on a side of the second length opposite the first length, the fold support extending behind the first length at the second fold to maintain a position of the second fold with respect to the support mount during peeling of the two mating sections of touch fastener. In some examples, the fold support includes a roller rotatable about an axis defined by a roller support coupled to the support mount. In some examples, the fold support includes a guide rod coupled to the support mount, with a portion of the substrate routed through an opening between the support mount and the guide rod. In some examples, the fold support is disposed adjacent a peel point of disengagement between the two mating sections of touch fastener. In some examples, the fold support is disposed adjacent a point of shear re-engagement where touch fasteners are moving from peel into shear load.

In some examples, the load-limited connection further includes a sleeve covering a portion of the substrate supporting the two mating sections of touch fastener and the engaged supplemental mating section of touch fastener, the sleeve inhibiting movement of the substrate and touch fasteners in a direction perpendicular to a shear plane of the two mating sections of touch fastener.

In some examples, at least one of the touch fasteners includes an array of discrete male fastening elements, each fastening element including an upstanding stem extending outwardly from the substrate and a head extending integrally from a distal end of the stem to a tip. In some examples, at least another of the touch fasteners includes a field of loops, and the heads of the male fastening elements include a lower surface forming a crook for retaining the loops. In some examples, a majority of the discrete fastening elements include one-way hooks, with the head of each fastening element of the majority extending forward from the stem in the same direction.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a diagram illustrating use of a fall arresting system including an energy dissipating link in accordance with one or more embodiments of the present disclosure;

FIG. 1B is an isolated diagram of the fall arresting system of FIG. 1A;

FIGS. 3A and 3B are side and end views of a first J-shaped hook;

FIGS. 3C and 3D are side and end views of a second J-shaped hook;

FIG. 8 is a cross-sectional side view of a fourth energy dissipating link; and

FIG. 9 is a cross-sectional side view of a fifth energy dissipating link;

Certain aspects of the drawings may be exaggerated to better show the features, process steps, and results. Like reference numbers and designations in the various drawings may indicate like elements.

DETAILED DESCRIPTION

Figure 2A:
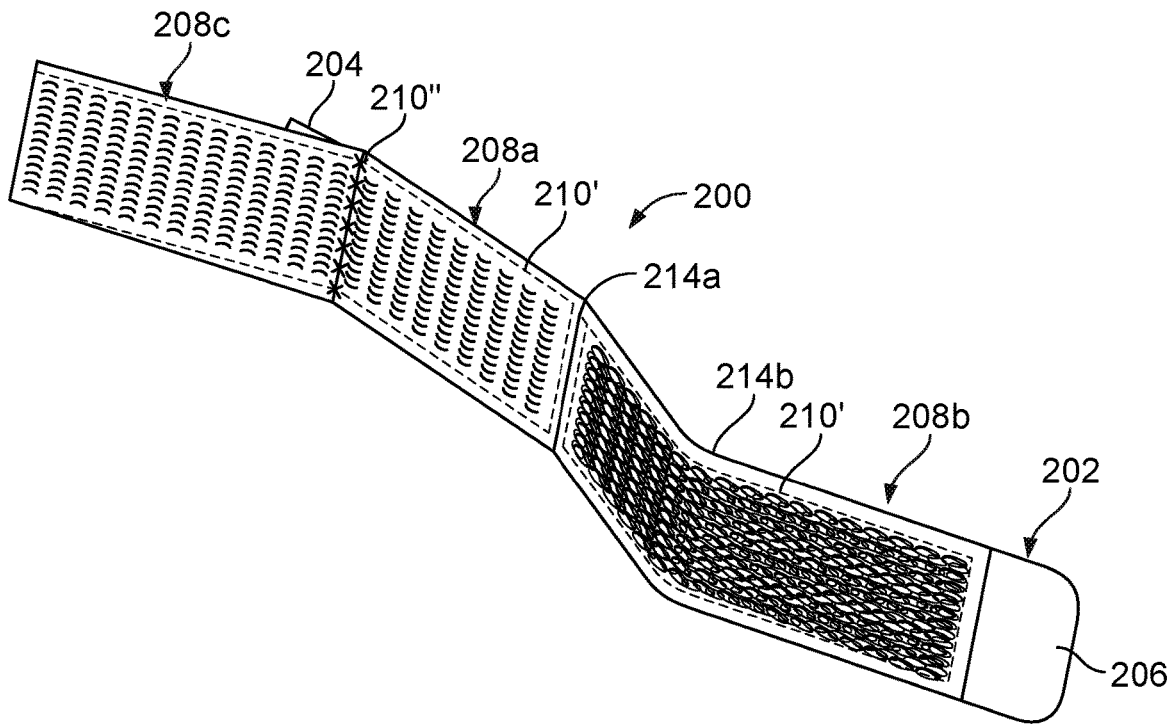
FIG. 2A is a perspective view of a first energy dissipating link in an unprimed state.

FIGS. 1A and 1B illustrate a climber 10 executing a controlled ascent along the side of a rock structure 20 using a guide rope 30 and a fall arresting system 40. Fall arresting system 40 features a safety line 42 and a tether 43 (often called a "lanyard"). Safety line 42 is anchored at one end to rock structure 20. Tether 43 includes a pair of carabiners 44a,b, a flexible belt 45, and an energy dissipating link 100 (often called a "shock absorber"). Carabiner 44a couples tether 43 to the free standing end of safety line 42, indirectly coupling the tether to the anchor point of rock structure 20. Carabiner 44b couples tether 43 to a safety harness 46 worn by climber 10. Thus, the climber is secured to the rock structure via the safety line and tether components. Link 100 of tether 43 is located on the tether's flexible belt 45 between carabiners 44a,b. In some examples, the energy dissipating link and the flexible belt are separate and independent components attached to one another by a mechanical coupling (e.g., stitching, heat welding, adhesive, etc.). In some other examples, these components are integrally formed as a single device.

Fall arresting system 40 is designed to limit the free fall distance of climber 10 should the climber inadvertently lose hold of rock structure 20 and/or guide rope 30. Fall arresting system 40 is further designed to limit the maximum arrest force ("MAF") exerted on climber 10 to a tolerable level. The term "maximum arrest force" refers to the short duration, peak dynamic force acting on the climber's body through tension in the safety line and tether when free fall is halted abruptly. The MAF is directly related to the accumulation of kinetic energy during free fall. Link 100 is designed to limit the MAF by dissipating (or diverting) this free-fall kinetic energy from fall arresting system 40. As described below, link 100 features a plurality of mating touch fasteners that form multiple (i.e., two or more) releasable closures. These mating touch fasteners are arranged to utilize the tension force transmitted along belt 45 during arrest to instigate disengagement. The term "touch fastener" as used in the present disclosure refers to a component that engages mechanically with (i.e., "fastens" to) another mating component, when the two components are placed into direct contact with one another. Various touch fastener configurations can be used in conjunction with the energy dissipating links described herein, including, but not limited to hook-and-loop, hook-and-pile, and hook-to-hook configurations.

Energy spent disengaging the touch-fastener closure is effectively spent/removed from fall arresting system 40, and therefore lessens the MAF. More specifically, the mating touch fasteners are arranged such that the tensile load applied to the fall arresting system by the weight of the climber's body pulls apart (or "disengages") the fasteners in both shear and peel. Even more specifically, the energy dissipating links described in the present disclosure provide multiple independent closures that are loaded in peel and shear, respectively. Shear disengagement is characterized by a relative sliding motion between the fasteners along a defined plane (the "shear plane") that typically runs parallel to the base of the fasteners. Peel disengagement, on the other hand, is characterized by progressively pulling the fasteners apart from one another at an angle from the shear plane.

One particular advantage that can be obtained by employing touch fasteners in this context is a relatively smooth disengagement during the fall arresting process. That is, because closures formed between two touch fasteners typically involve the engagement of hundreds or thousands of individual fastening elements, the progressive disengagement of those elements, in peel and/or shear, is effectively continuous at a high level. In practice, this means that the user does not perceive individual micro shocks during a fall arrest, such as may be the case when discrete areas of breakable connections are used.

Notably, the fall arresting system of FIGS. 1A and 1B is merely one of many applications in which the energy dissipating links of the present disclosure may be used. Other suitable applications include seat belts, parachute suspension lines, tow ropes, and the like. Further, the energy dissipating links described herein may be employed in any system where conventional textile absorbers/brakes are used to dissipate kinetic energy. Even further uses and applications may become apparent in view of the following disclosure.

Figure 2B:
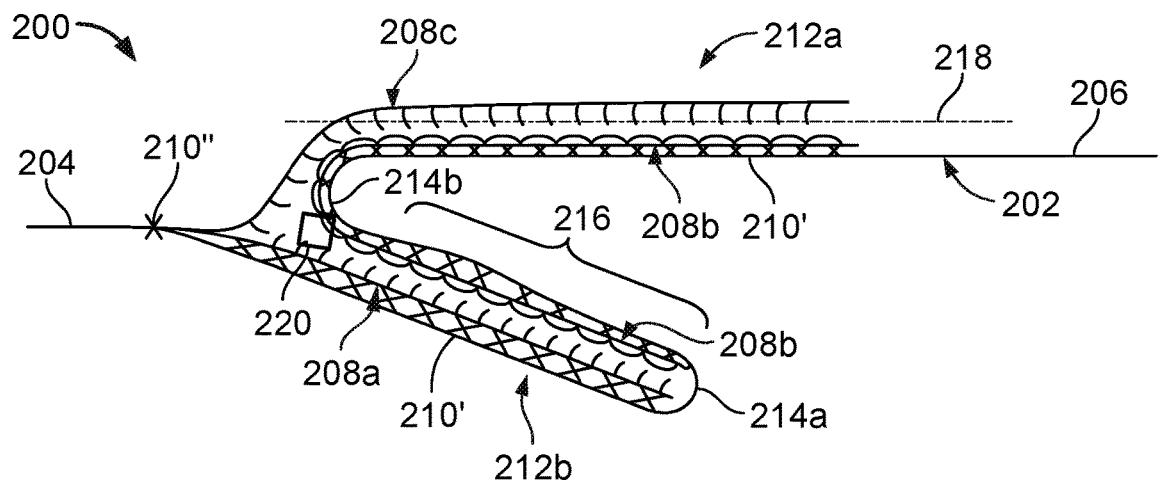
FIG. 2B is a cross-sectional side view of the first energy dissipating link in a primed state.

FIGS. 2A and 2B illustrate a first example energy dissipating link 200 in an unprimed and primed state, respectively. Link 200 includes an elongated base 202 extending continuously between a first end portion 204 and a second end portion 206. As noted above, in certain implementations, the end portions may be attached to, or integrated with, a flexible belt (e.g., flexible belt 45 of FIGS. 1A and 1B) that is coupled to an anchored safety line (e.g., safety line 42 of FIG. 1A). Of course, other configurations are also contemplated where, for example, one or both of the end portions are attached to a rigid external structure (see FIGS. 8 and 9). In some examples, base 202 is a relatively thin and flexible structure, which allows link 200 to be arranged— e.g., folded—into a compact package. Irrespective of form factor, however, base 202 is appropriately configured based on the intended application (with respect to, for example, material selection and manufacturing techniques) to provide sufficient tensile strength and dynamic load resiliency to prevent breakage during use.

In addition to base 202, link 200 further includes three touch fasteners 208a,b,c that are engageable with one another to form separate and independent first and second closures. Each of touch fasteners 208a,b,c is permanently coupled to base 202. By "permanently coupled" we mean that the touch fasteners are carried by the base, and held in a fixed position thereto during use and operation of the energy dissipating link. Stated plainly, the touch fasteners are not intended to become detached from the base at any point. In this example, touch fasteners 208a,b,c are directly attached to the respective portions of base 202 by lines of stitching.

As shown, first and second touch fasteners 208a,b are arranged parallel to base 202, extending from the opposite first and second end portions 204, 206 of the base towards an intermediate portion between the ends. First and second touch fasteners 208a,b are attached to base 202 along their entire length by a perimeter of stitching 210'. Third touch fastener 208c is permanently attached at the first end portion 204 of base 202 by a narrow band of stitching 210", leaving the remainder of the fastener free standing from the base. The stitching mechanisms shown and described in this embodiment (and others) for providing permanent attachments between the touch fasteners and underlying base are merely exemplary, and not intended to be limiting. In fact, numerous other suitable techniques may also be used to facilitate a permanent coupling between the touch fasteners and the base at above-described locations (e.g., heat welding, adhesives, chemical bonding, etc.). Further, in some examples, the touch fasteners may be integrally formed with the base as a single, contiguous mass.

Touch fasteners 208a,b,c include respective fields or arrays of releasably engageable fastening elements. More specifically, in this example, the fastening elements of first and third touch fasteners 208a,c are designed to mate with the fastening elements on respective portions of second touch fastener 208b in a non-permanent fashion (as compared to the stitching that connects the touch fasteners to the base). Accordingly, each of first and third touch fasteners 208a,c include an array of discrete male fastening elements (e.g. hook structures), and second touch fastener 208b includes a field of loop structures designed to engage the male fastening elements. An exemplary hook-to-loop engagement mechanism is described in detail below with reference to FIGS. 3A-4B, though various other suitable touch fastening configurations may also be used (e.g., hook-to-hook or hook-and-pile engagements). In any case, the mating fastening elements form separate and independent first and second releasable closures 212a,b when link 200 is in the primed state shown in FIG. 2A.

To transition link 200 from the unprimed state of FIG. 2A to the primed state of FIG. 2B, second releasable closure 212b is formed by folding base 202 over itself proximate the intermediate portion where first and second touch fasteners 208a,b meet. This first fold 214a causes first touch fastener 208a to overlay a portion of second touch fastener 208b, placing the male fastening elements of the first touch fastener into engagement with the loop structures of the second touch fastener. First releasable closure 212b is then formed by folding base 202 at the edge of the portion of second touch fastener 208b overlaying first touch fastener 208a. This second fold 214b presents the loop structures on the other portion of second touch fastener 208b for engagement with the male fastening elements of third touch fastener 208c.

As shown in FIG. 2B, the folded/primed configuration of base 202 causes first and second closures 212a,b to overlap one another in the longitudinal direction of base 202. Thus, first and second closures 212a,b are "longitudinally overlapping structures," with first closure 212a transmitting the entire tensile load between first and second end portions 204,206 during use of link 200. Second closure 212a, on the other hand, is formed on a longitudinally slack idler section 216 of base 202. That is, with tension transmitted entirely through first closure 212b, idler section 216 is effectively a non-load bearing portion of base 202. Idler section 216 remains a non-load bearing component until touch fasteners 208a,b,c are disengaged from one another, eliminating (or "releasing") first and second closures 212a,b.

As discussed below with reference to the progressive diagrams of FIG. 5, the idler section 216 of base 202 decreases in length during the progressive disengagement of first and second closures 212a,b. As is also discussed below, a tension load sufficient to cause shear disengagement of first closure 212a also induces the disengagement of second closure 212a in peel. More specifically, because touch fasteners 208a,b,c are supported on the same elongated base 202, shear displacement a second and third touch fasteners 208b,c in first closure 212a causes first and second touch fasteners in second closure 212b to become subjected to a peel load as the folded sections of base 202 are pulled apart. Touch fasteners 208a,b,c begin to pull apart from one another when the tensile load surpasses the shear strength of first closure 212a. The condition is referred to herein as a "tensile overload." By "tensile overload" we refer to a tensile load applied to one or both ends of the elongated base of the link that is sufficient to initiate disengagement of one or more touch fastening closures formed when the link is in a primed state. In this particular example, tensile overload corresponds directly to the shear strength of the first closure. However, various other configurations are also contemplated—e.g., where the tensile overload corresponds to the shear and/or peel strength of multiple closures.

First closure 212a defines a shear plane 218. The term "shear plane" as used in the present disclosure refers to a geometrical plane extending along the direction of shear disengagement between the two mating touch fasteners. Shear disengagement occurs when second and third touch fasteners 208b,c are pulled apart in a way that causes a relative sliding motion between them (e.g., a tensile force in a direction parallel to a planar base of the fasteners). Thus, shear plane 218 is oriented perpendicular to the face-to-face direction of touch fasteners 208b,c. As such, while shown in FIG. 2B as being substantially flat, the contour of shear plane 218 follows the orientation of touch fasteners 208b,c, and therefore may curve with any bending or folding of the flexible touch fasteners. Further, because touch fasteners 208b,c are positioned in a parallel orientation relative to base 202, so too is shear plane 218. Second closure 212b defines a peel point 220 extending in the transverse direction of base 202 proximate second fold 214b. Peel point 220 is the location where the peel load pulling apart second and third touch fasteners 208b,c is applied. The mechanics of peel and shear disengagement are described in further detail below with reference to FIGS. 4A and 4B.

FIGS. 3A-3D illustrate example fastening elements, J-hook structures in particular, that can be used in hook-and-loop touch-fastening closures. These and various other types of suitable fastening elements (such as palm tree, trilobal hooks, or mushroom-type fastening elements) can be implemented in the energy dissipating links described throughout this disclosure. U.S. Pat. Nos. 6,960,314 and 7,716,792, the entireties of which are incorporated herein by reference, describe various types of suitable fastening hook structures.

The hook 350 of FIGS. 3A and 3B has a J-shaped profile and curved sides, such as may be molded in a cavity formed between two adjacent mold plates in a mold roll employed in the Fischer process described in U.S. Pat. No. 4,794,028, leaving a parting line 352 down the middle of the hook at the interface between the two mold plates. The pedestal stem portion 354 defines a rather large included angle α (e.g., about 61.5 degrees) between front and rear edges. The head portion 356 has a re-entrant tip 358, meaning that it extends downward toward the base of the hook to form a concave crook 360 for entrapping loop fibers. The tip 358 extends downward to a distance "d" from the most upper surface of the hook, and the entire hook has an overall height "h", as measured normal to the base. The hook 350' of FIGS. 3C and 3D also has a J-shaped profile, but has flat sides as seen in FIG. 3D. Thus, its tip 358' extends completely across the hook, and the upper surface of its head portion 356' presents a rather broad surface to the mating material. The stem portion 354' defines the same included angle α, the tip 358' also extends down to a distance "d", and the hook 350' also has an overall height "h".

Figure 4A:
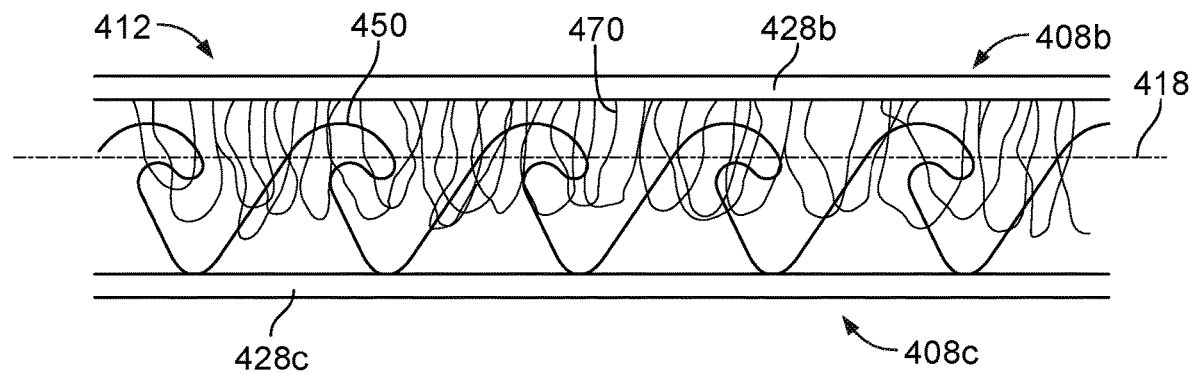
FIG. 4A is a side view of an engagement interface between mating touch fasteners along a shear plane.

FIG. 4A illustrates an example closure 412 formed between mating touch fasteners 408b,c. Closure 412 of FIG. 4A is similar to first closure 212a of FIG. 2B in that it is configured for shear disengagement, and therefore defines a shear plane 418. In this example, touch fastener 408c includes an array of J-hook fastening elements 450 formed on a base 428c; and touch fastener 408b includes a field of loop material 470 formed on a base 428b. Touch fasteners 408b,c are shown here in an engaged state, with the loops 470 of touch fastener 408b trapped within the concave crooks of hooks 450 carried on touch fastener 408c. The engaged hooks 450 and loops 470 can be disengaged in shear by pulling touch fasteners 408b,c apart from one another along the shear plane 418. When the applied tensile force reaches the tensile strength of closure 412, hooks 450 deform and/or loops 470 sever to release the loops from the crooks of the hooks. In some implementations, it may be advantageous to design the hook-and-loop system such that the hooks deform at a lower tensile load than the loops (i.e., a hook-limited closure), which allows the loops to re-engage with other hooks during the shearing motion, thereby increasing the amount of energy dissipation.

In this example, the array of J-hook fastening elements 450 are arranged in parallel rows along the base 428a of touch fastener 408c. As shown, fastening elements 450 are arranged with the head portions oriented in the same direction, forming a one-way hook configuration. An array of "one-way hooks" is characterized by at least a majority of the discrete fastener elements being provided as hook structures with head portions that extend forward from the stem in a common direction. Touch fasteners featuring one-way hooks present significant shear strength when pulled in a direction opposing the directed re-entrant tip of the head, and little to no shear strength when pulled in the opposite direction. One-way hooks can be particularly advantageous in the present context because they permit manual resetting of the energy dissipating link by simply sliding the touch fasteners back to the original engaged position along the shear plane.

Figure 4B:
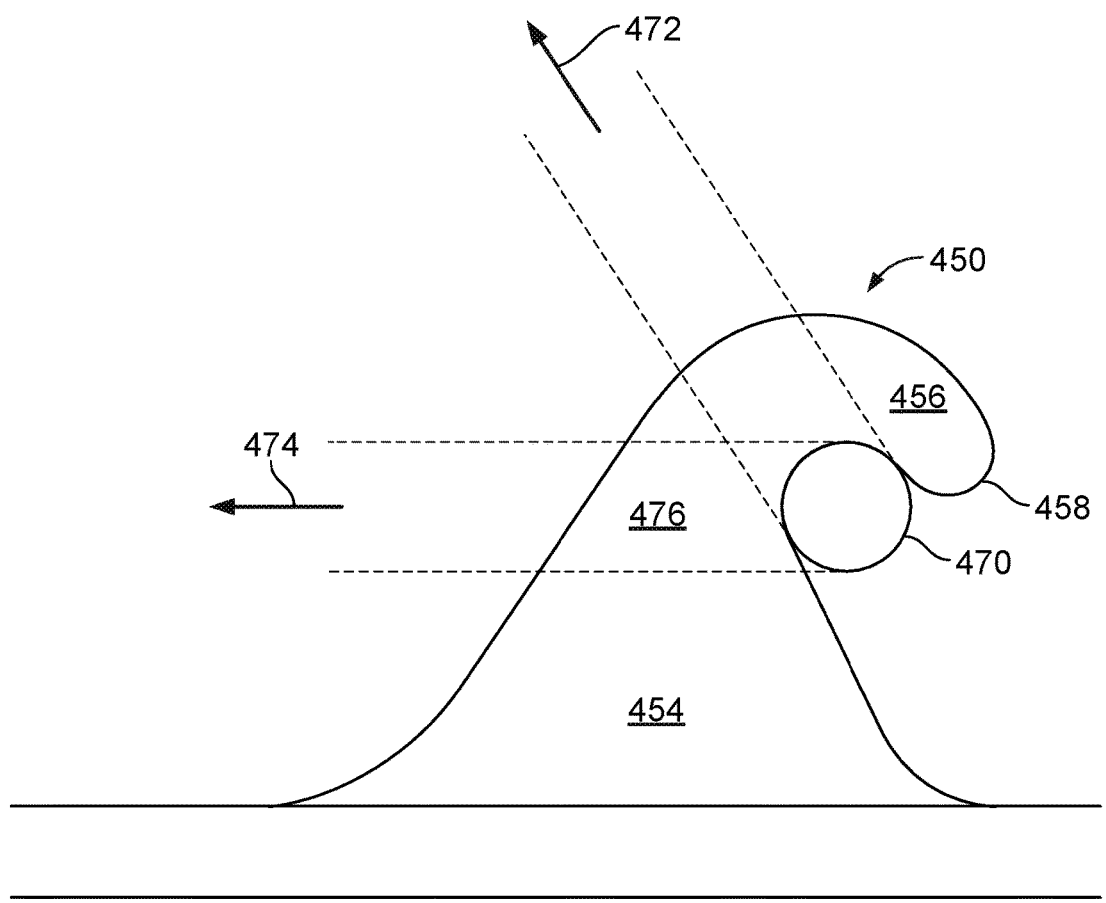
FIG. 4B is a side view of view of a J-shaped hook engaged with a loop structure demonstrating both peel and shear disengagement mechanisms.

FIG. 4B illustrates a J-hook fastening element 450 engaged by a loop fiber 470. As shown, loop fiber 470 is entrapped in the concave crook 460 defined by the fastening element's re-entrant tip 458. The arrows 472 and 474 are representative of respective peel and shear forces exerted on fastening element 450 and loop fiber 470 when two engaged touch fasteners are pulled apart from one another. When peel load 472 is applied, loop fiber 470 is pulled upward at an acute angle through the head portion 456 of fastening element 450. In a hook-limited limited closure, a certain magnitude of peel load 472 causes deformation of head portion 456, which releases loop fiber 470 from crook 460.

The application of shear load 474 pulls loop fiber 470 laterally across fastening element 450 at a neck region 476 between stem portion 454 and head portion 456. As is visually apparent from FIG. 4B, the thickness of fastening element 450 is greater at neck region 476 than head portion 456. As such, a greater magnitude of tensile force is necessary in shear as compared to peel in order to cause the hook deformation that releases loop fiber 470 from crook 460. This effect is heightened by the fact that the closures discussed herein involve thousands of individual fastening elements. Further still, as explained in U.S. Pat. No. 4,271,566, the entirety of which is incorporated herein by reference, shear disengagement requires the concurrent release of all inter-engagements between individual mating fastening elements. Therefore, the force required to disengage mated touch fasteners by shear (the "shear strength") is greater than the force required to pull them apart by progressive peeling (the "peel strength"). Moreover, in the current context, shear disengagement also results in greater kinetic energy dissipation (as compared to peel) because the individual fastening elements tend to re-engage as the touch fasteners slide past one another. Thus, a shear force must be exerted continually over time to fully break the closure.

Figure 5:
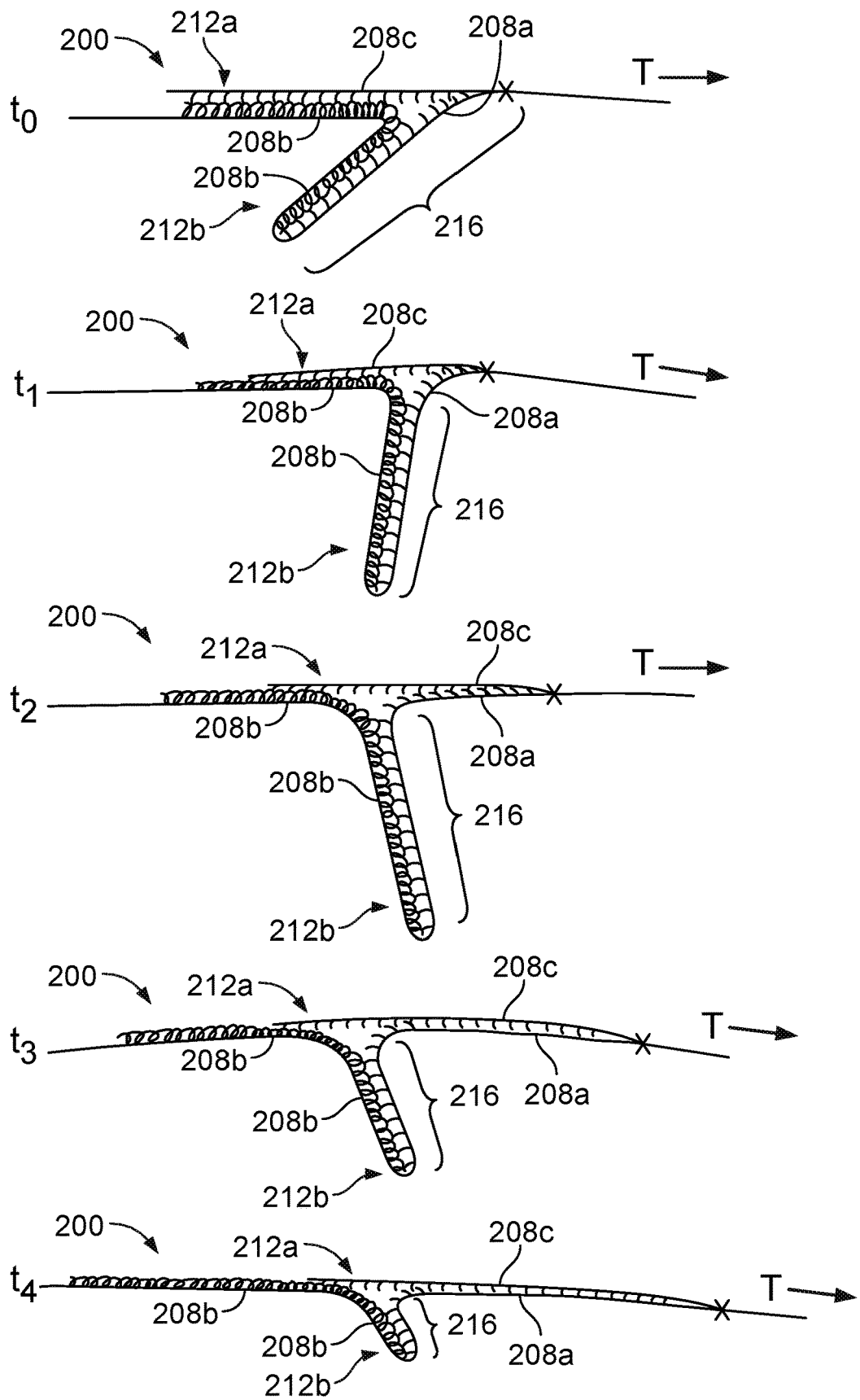
FIG. 5 is a sequence of cross-sectional diagrams progressively illustrating the release of the first energy dissipating link of FIGS. 2A and 2B.

FIG. 5 illustrates the progressive disengagement of touch fasteners 208a,b,c under a continually applied tensile load "T" applied across link 200, such as would occur during the fall arresting procedure described above. Note that while this sequence is shown gradually and stepwise in the illustrations of FIG. 5, in practice, disengagement may take place in a rapid, nearly continuous motion.

The first illustration at to demonstrates idler section 216 as a non-load bearing component, and the last illustration at $t_f$ demonstrates idler section 216 just before receiving the tensile load upon the elimination of first and second closures 212a,b. At $t_0$, first and second closures 212a,b of link 200 remain at rest and intact because the tensile overload condition as not yet been reached. The onset of tensile overload at $t_1$ causes the shear disengagement of first closure 212a and the peel disengagement of second closure 212b. Disengagement of these first and second closures 212a,b continues progressively and continuously over time until touch fasteners 208a,b,c have been entirely released from one another, unfurling base 202 and transmitting the tensile load throughout the base, including the portion initially forming idler section 216. As shown, idler section 216 decreases in length as touch fasteners 208a,b of second closure 212b are pulled apart from one another. In some examples, as second closure 212b is disengaged, at least a portion of the loop material of second touch fastener 208b re-engages with the male touch fasteners of third touch fastener 208c. Re-engagement of second touch fastener 208b occurs when the underlying portion of base 202 is removed from the idler section 216 during the progressive release of second closure 212b, and subsequently raked across third touch fastener 208c. This allows the loops of second touch fastener 208b to snag onto the male fastening elements of third closure 208c. Re-engagement of second touch fastener 208b is advantageous, because it effectively extends the length of first closure 212a, resulting in increased energy dissipation.

The shear strength of a typical touch-fastener closure tends to decrease during disengagement. This effect is due to the decreasing area of engagement between the touch fasteners as they are progressively pulled apart. In the present context of energy dissipation, it may be advantageous to counteract this effect, or even maintain a substantially constant shear strength throughout the disengagement process. This results in an increased amount of energy dissipation per unit length. Promoting re-engagement between independent closures is one technique for enhancing energy dissipation. Another technique involves varying the physical characteristic of the touch fasteners along the shear plane. These varied physical characteristics may provide increasing shear fastening performance (e.g., greater shear strength per unit area) as the touch fasteners are progressively disengaged. Exemplary physical characteristics include the density of male fastening elements and/or loops, the stiffness of the male fastening elements, and/or the tenacity of the loop fibers. In some examples, the physical characteristics of the touch fasteners may vary in opposite directions. So, for example, in the context of first closure 212a, the high density/high stiffness fastening elements of touch fastener 208c may initially engage the low density/low tenacity loops of second touch fastener 208b, and vice versa. Then, during shear disengagement, the high density/high stiffness fastening elements of touch fastener 208c progressively re-engage with the high density/tenacity loops of touch fastener 208b to maintain a substantially constant (or even increasing) shear strength.

FIGS. 6-9 illustrate various energy dissipating links that include additional features for promoting fastener re-engagement from the second closure released in peel to the first closure released in shear.

Figure 6:
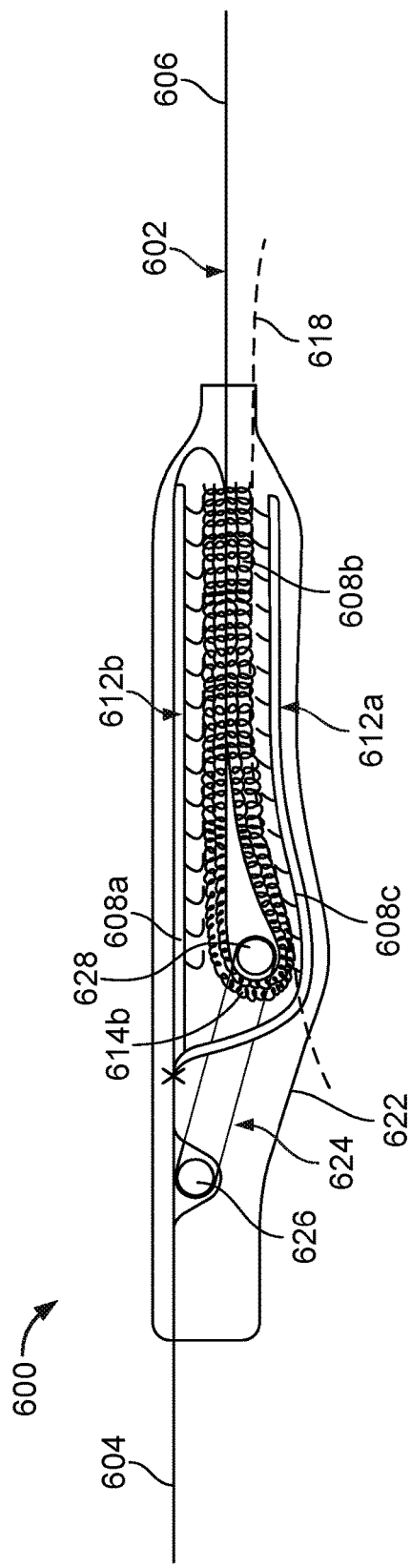
FIG. 6 is a cross-sectional side view of a second energy dissipating link.

FIG. 6 illustrates a second example energy dissipating link 600. Similar to link 200, link 600 includes an elongated base 602 extending continuously from a first end portion 604 to a second end portion 606. And, like link 200, link 600 includes three touch fasteners 608a,b,c arranged on base 602 to form first and second independent closures 612a,b. In this example, link 600 further includes a sleeve 622 located between the ends portions 604,606 of base 602. As shown, sleeve 622 is positioned on base 602 so as to cover and surround first and second closures 612a,b. Sleeve 622 is appropriately configured to inhibit movement of base 602 in a direction perpendicular to the shear plane 618 of first closure 612a. For instance, in some examples, sleeve 622 may be provided in the form of a rigid plastic or metal structure resistant to deformation. In some other examples, sleeve 622 may be a compressive or tight-fitting resilient structure that accommodates flexibility in the base 602, but resists movement relative to shear plane 618.

Benefits associated with the added sleeve 622 are at least twofold. First, sleeve 622 inhibits or prevents touch fasteners 608b,c of first closure 612a from being subjected to combined peel and shear loading, which would decrease the closure's strength and result in less energy dissipation. This combined loading phenomenon may occur when the tensile load at the ends of base 202 is misaligned from shear plane 618. Sleeve 622 ensures that most, if not all, of the tensile load is applied to first closure 612a purely in shear. Second, sleeve 622 promotes re-engagement of second touch fastener 608b between second and first closures 612b,a by forcing the portion of second touch fastener 608b released from second closure 612b into close proximity with third touch fastener 608c during the disengagement process.

Link 600 further includes a guide member 624 configured to constrain movement of base 602 along a defined path as it is progressively unfurled during the disengagement of first and second closures 612a,b in shear and peel, respectively. In this example, guide member 624 is provided in the form of a rigid linkage including an attachment rod 626 and a guide rod 628. Attachment rod 626 is held fixed to a portion of base 602 proximate first end portion 604. Guide rod 628 extends outward from the attachment rod 626, leaving an opening between the rods. The intermediate portion of base 602 is routed through the opening and pulled taught, such that the base is supported in the transverse direction on guide rod 628 proximate its second fold 614b. During disengagement, the portion of base 602 released from idler section 216 by peel disengagement of second closure 612b is forced against guide rod 628, and led into close proximity of third touch fastener 208c, which causes re-engagement of second touch fastener 608b.

Figure 7:
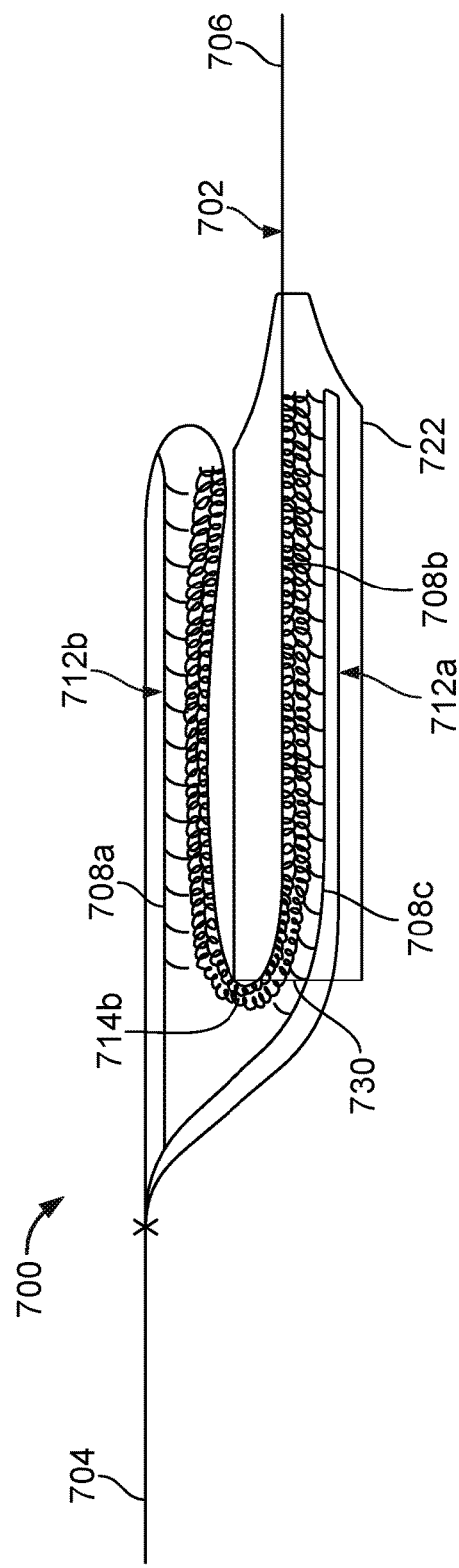
FIG. 7 is a cross-sectional side view of a third energy dissipating link.

FIG. 7 illustrates a third example energy dissipating link 700. Like the prior examples, link 700 includes an elongated base 702 extending continuously between first and second end portions 704,706. Link 700 also includes three touch fasteners 708a,b,c arranged on base 702 to form first and second independent closures 712a,b. Link 700 still further includes a sleeve 722 that is similar in structure to sleeve 622 of link 600. In this example, however, sleeve 722 covers only the portion of base 702 forming first closure 712a in order to inhibit the combined loading phenomenon discussed above. Thus, as shown, sleeve 722 extends from a point proximate second end portion 706 to the second fold 714b of base 702. Here, the edge 730 of sleeve 722 interfaces with fold 714b in a similar manner to guide rod 628 in the prior example, providing transverse support to base 702 during disengagement in order to introduce second touch fastener 608b to third touch fastener 608c for re-engagement.

FIG. 8 illustrates a fourth example energy dissipating link 800. Like the prior examples, link 800 includes an elongated base 802 carrying three touch fasteners 808a,b,c between its opposing end portion 804,806 to form two independent closures 812a,b. Notably, in this example, first and third touch fasteners include a field of loop structures, and second touch fastener includes an array of male fastening elements (e.g., J-hooks). This configuration of touch fasteners 808a,b,c is essentially the opposite of prior examples, yet the principles of operation are the same. Further still, link 800 differs from prior examples in that the first portion 804 of base 802 is coupled to an external rigid structure 10 as opposed to a flexible tether. Link 800 further includes a guide member 824 that is similar in construction to guide member 624 of link 600. In this example, however, guide member 824 includes an attachment rod 826 coupling the guide member to base 802, and a roller 832 providing transverse support to the base. Roller 832 is rotatable about an axis defined by a roller support member 834 extending from attachment rod 826.

FIG. 9 illustrates a fifth example energy dissipating link 900. Similar to the prior examples, link 900 includes an elongated base 902 extending continuously between first and second end portions 904,906. However, in this example, link 900 includes two, as opposed to three, touch fasteners 908a,b. The first and second touch fasteners 908a,b are configured in a manner that is similar to touch fasteners 808a,b of link 800, forming a second closure 912b. Moreover, base 902 is folded in the same way as base 902, with a guide member 924 routing the base along a defined path during disengagement to promote re-engagement of second touch fastener 908b. With link 900, the first closure 912a is formed by engagement of the second touch fastener 908b with a mating touch fastener 12 carried on an external structure 10'. In this example, because all of the mating touch fasteners are not permanently coupled to the base of the link, there is a significantly different principle of operation in the disengagement sequence. Here, when a tensile load is applied to first end portion 904, first and second closures 912a,b are both immediately and simultaneously loaded in shear and peel, respectively (as compared to prior examples where peel loading of the second closure was instigated by the onset of shear disengagement of the first closure). Further, because the peel strength of second closure 912b is significantly less than the shear strength of first closure 912a, mating touch fasteners 908a,b begin to disengage in peel absent corresponding shear disengagement of touch fasteners 908b and 12 of first closure 912a. As the portion of second touch fastener 908b is released from second closure 912b, guide member 924 facilitates its re-engagement with touch fastener 12, which increases the shear strength of first closure 912a. As a result, the entire second closure 912b is released by peel before the touch fasteners of first closure 912a begin to be pulled apart in shear.

A number of embodiments of the invention have been described. Nevertheless, it will be understood that various modifications may be made without departing from the spirit and scope of the inventions. For example, while the male fastening elements described above are manufactured by a molding technique, woven hook-and-loop touch fasteners are also suitable for use in conjunction with the energy dissipating links of this disclosure. U.S. Pat. No. 5,996,189, the entirety of which is incorporated herein by reference, describes an exemplary process for producing woven hooks and loops. In some implementations—e.g., where the touch fasteners are integrated with the supporting base of the link—woven hook-and-loop fasteners may be particularly advantageous because the fields of fastening elements can be formed by weaving directly into the base strap. As described in U.S. Pat. No. 5,996,189, multi-filament yarns interlaced with the base strap can be used to form loops, and monofilament yarns can be processed (e.g., heat set and cut) to form hooks.

What is claimed is:

1. An energy dissipating link, comprising:
   an elongated base having opposite, first and second end portions;
   a plurality of touch fasteners permanently coupled to the base, each of the plurality of touch fasteners releasably engageable with at least one other of the touch fasteners,
   wherein the plurality of touch fasteners are arranged on the base to form separate and independent first and second closures, each of the first and second closures comprised of engagements between respective fastening elements of two or more of the plurality of touch fasteners, and
   wherein the plurality of touch fasteners is configured such that:
   in response to a tensile load applied to the end portions of the base, engaged touch fasteners of the first closure are loaded in shear along a shear plane; and
   in response to a tensile overload condition causing shear displacement of the touch fasteners the first closure, the engaged touch fasteners of the second closure are subjected to a peel load; and
   a guide member configured to constrain movement of an intermediate portion of the base between the first and second end portions along a defined path as the first and second closures are disengaged in shear and peel, respectively.

2. The energy dissipating link of claim 1, wherein the second closure is formed on a slack idler section of the base that at least partially overlaps the first closure.

3. The energy dissipating link of claim 1, wherein at least one of the plurality of touch fasteners is associated with both of the first and second closures.

4. The energy dissipating link of claim 1, further comprising a sleeve covering a portion of the base supporting the first and second closures, the sleeve inhibiting movement of the base and the engaged touch fasteners of the first and second closures in a direction perpendicular to the shear plane of the first closure.

5. The energy dissipating link of claim 1, wherein the guide member comprises a transverse base support secured to one of the end portions of the base and about which the intermediate portion of the base is trained.

6. The energy dissipating link of claim 5, wherein the transverse base support comprises an edge of an opening of a sleeve surrounding the first closure.

7. The energy dissipating link of claim 5, wherein the transverse base support comprises a roller rotatable about an axis defined by a roller support fixed to one of the end portions of the base.

8. The energy dissipating link of claim 5, wherein the transverse base support comprises:
   an attachment piece held fixed relative to one of the first or second end portions of the base; and
   a guide rod coupled to the attachment piece, with the intermediate portion of the base routed through an opening between the attachment piece and the guide rod.

9. The energy dissipating link of claim 5, wherein the transverse base support is disposed adjacent a peel point of disengagement between the touch fasteners of the second closure.

10. The energy dissipating link of claim 5, wherein the transverse base support is disposed adjacent a point of shear re-engagement between a touch fastener of the second closure and a touch fastener of the first closure.

11. The energy dissipating link of claim 1, wherein the shear plane extends parallel to the base within the first closure.

12. The energy dissipating link of claim 1, wherein at least one of the plurality of touch fasteners comprises an array of discrete male fastening elements, each fastening element comprising an upstanding stem extending outwardly from the base and a head extending integrally from a distal end of the stem to a tip.

13. The energy dissipating link of claim 12, wherein at least another of the plurality of touch fasteners comprises a field of loops, and wherein the heads of the male fastening elements comprise a lower surface forming a crook for retaining the loops.

14. The energy dissipating link of claim 12, wherein a majority of the discrete fastening elements comprise one-way hooks, with the head of each fastening element of the majority extending forward from the stem in the same direction.

15. The energy dissipating link of claim 1, wherein a first touch fastener of the first closure is directly attached to the base and the remainder of the first touch fastener is free standing relative to the base, such that, upon tensile overload, an opposite free-standing end of the first touch fastener is displaced under shear load with respect to a second touch fastener of the first closure.

16. The energy dissipating link of claim 15, wherein two longitudinal ends of the second touch fastener are both directly attached to the base.

17. An energy dissipating link, comprising:
- an elongated base having opposite, first and second end portions;
- a plurality of touch fasteners permanently coupled to the base and releasably engageable with at least one other of touch fastener,
- wherein, when the link is in a primed state, the plurality of touch fasteners forms separate and independent first and second closures, each of the first and second closures comprised of engagements between respective fastening elements of two or more touch fasteners, and
- wherein the plurality of touch fasteners is configured such that, in response to a tensile overload applied to the end portions of the base, the touch fasteners of the first and second closures engaged in the primed state of the link are progressively disengaged, with at least a portion of one touch fastener of the second closure re-engaging with at least a portion of one touch fastener of the first closure as the tensile overload is applied; and
- a guide member configured to constrain movement of an intermediate portion of the base between the first and second end portions along a defined path as the first and second closures are disengaged.

* * * * *